United States Patent

Bishop et al.

(10) Patent No.: US 8,175,768 B2
(45) Date of Patent: May 8, 2012

(54) AREA HEALTH MANAGERS FOR AIRCRAFT SYSTEMS

(75) Inventors: Douglas L. Bishop, Phoenix, AZ (US); Timothy J. Felke, Glendale, AZ (US); Pavel P H Hynek, Olomouc (CZ)

(73) Assignee: Honeywell International Inc., Morristown, NJ (US)

( * ) Notice: Subject to any disclaimer, the term of this patent is extended or adjusted under 35 U.S.C. 154(b) by 1354 days.

(21) Appl. No.: 11/766,489

(22) Filed: Jun. 21, 2007

(65) Prior Publication Data

US 2008/0319603 A1 Dec. 25, 2008

(51) Int. Cl.
*G05B 11/01* (2006.01)
*G01M 17/00* (2006.01)

(52) U.S. Cl. .......... 701/30.8; 701/29.1; 700/79; 700/23; 714/27

(58) Field of Classification Search ................ 701/3, 29, 701/35, 79; 700/79, 23; 714/27
See application file for complete search history.

(56) References Cited

U.S. PATENT DOCUMENTS

| | | | | |
|---|---|---|---|---|
| 4,943,919 A * | 7/1990 | Aslin et al. ........................ 701/3 |
| 7,308,614 B2 * | 12/2007 | Kojori .............................. 714/47 |
| 2003/0167111 A1 * | 9/2003 | Kipersztok et al. ............. 701/29 |
| 2004/0199307 A1 * | 10/2004 | Kipersztok et al. ............. 701/29 |
| 2004/0204805 A1 * | 10/2004 | Betters et al. ................... 701/35 |
| 2005/0028033 A1 * | 2/2005 | Kipersztok et al. ............. 714/27 |
| 2005/0223290 A1 * | 10/2005 | Berbaum et al. ................ 714/30 |
| 2006/0047378 A1 * | 3/2006 | Betters et al. ..................... 701/3 |
| 2008/0097662 A1 * | 4/2008 | Volponi .......................... 701/29 |
| 2008/0319603 A1 * | 12/2008 | Bishop et al. ................... 701/35 |
| 2009/0192663 A1 * | 7/2009 | Bennewitz ...................... 701/29 |
| 2010/0042289 A1 * | 2/2010 | Beacham, Jr. .................. 701/35 |
| 2010/0161169 A1 * | 6/2010 | Ramanathan et al. .......... 701/33 |

* cited by examiner

*Primary Examiner* — John Nguyen
*Assistant Examiner* — Brian J Broadhead
(74) *Attorney, Agent, or Firm* — Ingrassia Fisher & Lorenz, P.C.

(57) ABSTRACT

An aircraft system includes an aircraft subsystem generating monitor trips related to the health of the aircraft subsystem; and an area health manager coupled to the aircraft subsystem. The area health manager includes a data receiver for receiving the monitor trips from the aircraft subsystem; a fault detector for processing inputs based on the monitor trips to identify faults; and an execution sequence queue coupled to the fault detector for storing a plurality of execution entities. Each of the plurality of execution entities is associated with a specific logic operation in the fault detector that is executed when the associated execution entity is in a first predetermined state.

20 Claims, 4 Drawing Sheets

AREA HEALTH MANAGERS FOR AIRCRAFT SYSTEMS

TECHNICAL FIELD

The present invention generally relates to aircraft systems, and more particularly relates to area health mangers for aircraft systems.

BACKGROUND

Aircraft are typically equipped with area health managers to evaluate and report on the state of the various components of the aircraft. The area health manager receives a large amount of data, typically in the form of monitor trips, from the other components of the aircraft. These monitor trips must be evaluated in fault processing modules with logic designed to determine whether the monitor trips represent faults that should be reported to a central maintenance computer. The monitor trips and associated logic require a large amount of processing resources, particularly considering that the typical processing cycle of the area health manager is 6 Hertz. Conventional fault processing modules of area health managers may not be able to adequately process the incoming monitor trips through the associated logic in the necessary time allotted.

Accordingly, it is desirable to provide area health managers for aircraft systems with increased processing efficiency. In addition, it is desirable to provide fault detectors for area health managers of aircraft that reduce the required processing resources. Furthermore, other desirable features and characteristics of the present invention will become apparent from the subsequent detailed description of the invention and the appended claims, taken in conjunction with the accompanying drawings and this background of the invention.

BRIEF SUMMARY

In one exemplary embodiment, an aircraft system includes an aircraft subsystem generating monitor trips related to the health of the aircraft subsystem; and an area health manager coupled to the aircraft subsystem. The area health manager includes a data receiver for receiving the monitor trips from the aircraft subsystem; a fault detector for processing inputs based on the monitor trips to identify faults; and an execution sequence queue coupled to the fault detector for storing a plurality of execution entities. Each of the plurality of execution entities is associated with a specific logic operation in the fault detector that is executed when the associated execution entity is in a first predetermined state.

In another exemplary embodiment, an area health manager comprises a data receiver for receiving monitor trips from an aircraft subsystem; a fault detector for processing inputs based on the monitor trips to identify faults; and an execution sequence queue coupled to the fault detector for storing a plurality of execution entities. Each of the plurality of execution entities is associated with a specific logic operation in the fault detector that is executed when the associated execution entity is in a first predetermined state.

In yet another exemplary embodiment, a data processing unit includes a data receiver for receiving data; a data processing module coupled to the data receiver and configured to process inputs based on the data; and an execution sequence queue coupled to the data processing module for storing a plurality of execution entities. Each of the plurality of execution entities is associated with a specific logic operation in the data processing module that is executed when the associated execution entity is in a first predetermined state.

BRIEF DESCRIPTION OF THE DRAWINGS

Exemplary embodiments will hereinafter be described in conjunction with the following drawing figures, wherein like numerals denote like elements, and wherein.

DETAILED DESCRIPTION OF A PREFERRED EMBODIMENT

The following detailed description is merely exemplary in nature and is not intended to limit the invention or the application and uses. Furthermore, there is no intention to be bound by any theory presented in the preceding background of the invention or the following detailed description.

Figure 1:
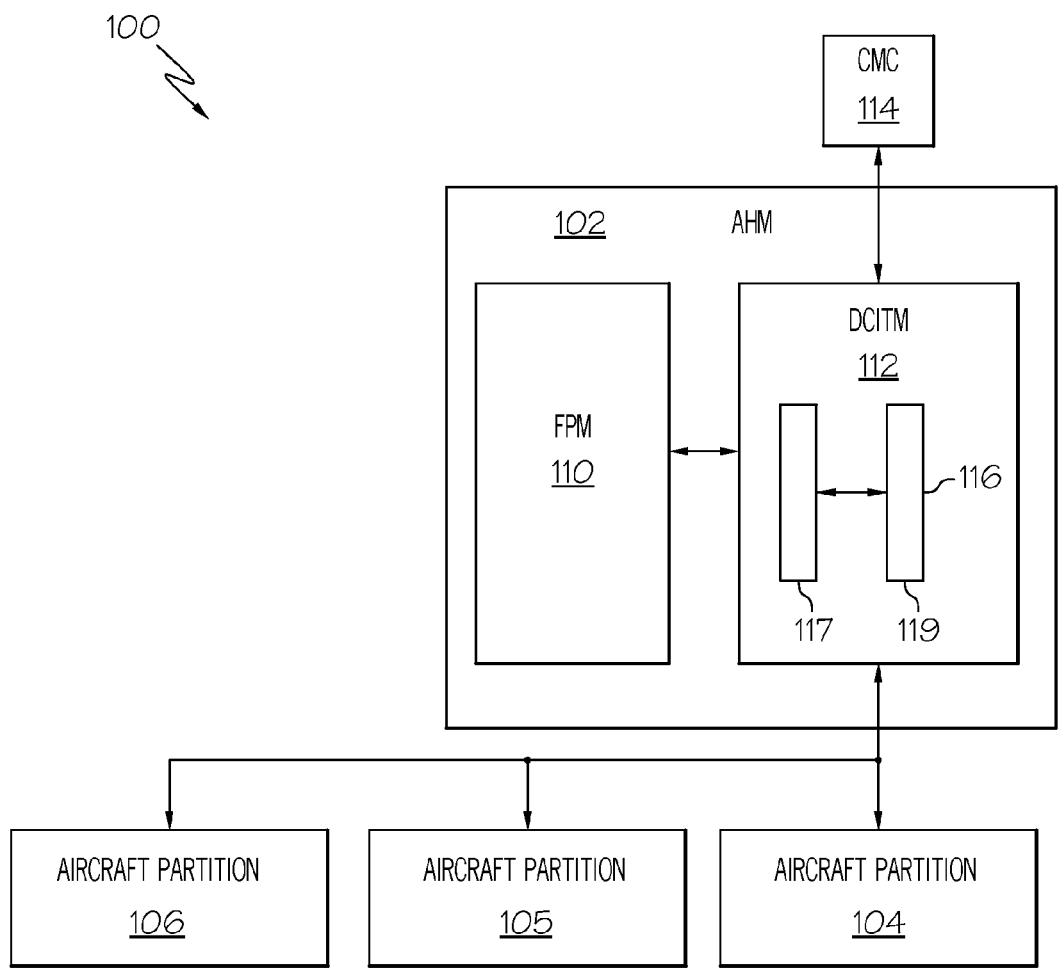
FIG. 1 is a block diagram of an aircraft system having an area health manager in accordance with an exemplary embodiment.

FIG. 1 is a block diagram of an aircraft system 100 in accordance with an exemplary embodiment. The aircraft system 100 includes a data processing unit such as an area health manager (AHM) 102 coupled to one or more aircraft subsystems, such as aircraft partitions 104-106. The aircraft partitions 104-106 generally assist in the control and operation of the aircraft, and may include auto-flight, primary flight, high lift, air data reference computer, signal processing, and/or additional types of partitions. Although three aircraft partitions 104-106 are illustrated, it should be appreciated that a greater or fewer number of partitions can be provided.

Generally, the AHM 102 is responsible for determining, recording, and reporting the health status for the aircraft system 100, particularly the aircraft partitions 104-106. The AHM 102 includes a data processing module such as a fault processing module (FPM) 110 coupled to a data receiver, such as data collection and initiated test module (DCITM) 112. The DCITM 112 receives monitor trips to the AHM 102 from the aircraft partitions 104-106, initiates testing procedures for the monitor trips, and forwards the monitor trips to the FPM 110. The monitor trips can be any form of data that indicates the state of one or more components of the aircraft. Although the illustrated embodiment depicts the DCITM 112 as a single module, it should be appreciated that the DCITM 112 may comprise separate data collector and initiated test modules.

In one embodiment, the DCITM 112 includes a ping pong buffer 116 with two registers 117, 119. The incoming monitor trips for a current processing cycle are loaded into the first register 117 of the ping pong buffer 116, and the monitor trips for an immediately preceding processing cycle are loaded the second register 119 of the ping pong buffer 116. The DCITM 112 compares the two registers 117, 119 of the ping pong buffer 116, and thus, the monitor trips from the current processing cycle with the monitor trips from the preceding processing cycle. If the comparison yields a difference between any of the monitor trips, those monitor trips are provided to the FPM 110.

As will be discussed in further detail below, the FPM 110 processes the monitor trips received from the DCITM 112 and reports on the health status in the form of fault reports and maintenance memos to a central maintenance computer (CMC) 114 via the DCITM 112. The FPM 110 processes the monitor trips from the DCITM 112 during every processing cycle. In one embodiment, the processing cycle executes 6 times a second.

Figure 2:
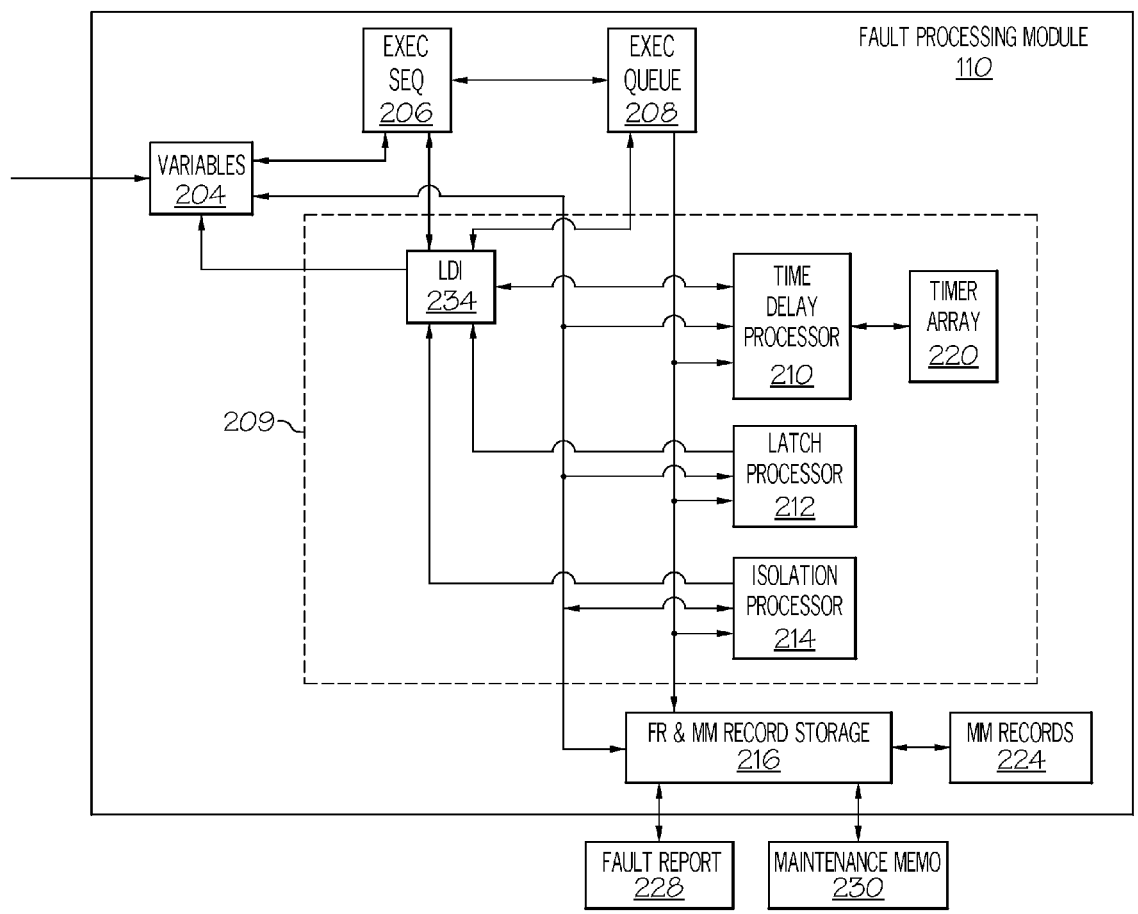
FIG. 2 is a more detailed block diagram of a fault processing module suitable for use in the area health manager of FIG. 1.

FIG. 2 is a more detailed block diagram of the FPM 110 of the AHM 102 of the aircraft system 100 of FIG. 1. As the monitor trips are received, the FPM 110 stores the monitor trips in a variables table 204. The variables table 204 is coupled to a loadable diagnostic information (LDI) database 234 in a fault detector 209. The LDI database 234 stores isolation logic through which the monitor trips are processed to determine faults.

The isolation logic stored in the LDI database 234 can represent logic such as Boolean logic, including NOT gates, AND gates, and OR gates. The isolation logic may also include accommodations for latches and delays. Generally, latches are data storage elements used to store information, and delays are elements that delay the output of a logic element for a given period of time. As discussed in further detail below with reference to FIG. 3, the isolation logic can be in the form of logic tables.

As noted above, the variables table 204 receives the monitor trips and provides inputs to the isolation logic in the LDI database 234. Generally, the monitor trips in the variables table 204 are associated with one or more portions of isolation logic, as well as latches logic and delay logic that may form part of the isolation logic. The LDI database 234 associates the monitor trips in the variables table 204 with specific logic operations. As will be discussed in further detail below, an execution queue 208 is coupled to the variables table 204 and the LDI database 234 and maintains an execution sequence of the specific logic operations to be executed during a given cycle. The fault detector 209 further includes an isolation processor 214, a time delay processor 210, and a latches processor 212 that respectively execute the specific logic operations in the LDI database 234 associated with the isolation logic, the delay logic, and the latches logic utilizing inputs from the variables table 204. An execution sequence processor 206 is coupled to the execution sequence queue 208 to process the execution sequence of logic to determine when the respective isolation processor 214, a time delay processor 210, and a latches processor 214 is to execute a particular specific logic operations in the LDI database 234. A timer array 220 also forms part of the fault detector 209 and is coupled to the time delay processor 210 assists the time delay processor 210 in maintaining the delays during the processing of delay logic. In an alternate embodiment, an equation processor can be provided to process additional logic stored in the LDI database 234.

The outputs from executing the logic stored in the LDI database 234 are provided in the form of fault reports (FR) and maintenance memos (MM) to the FR and MM record storage 216. A MM records database 224 is coupled to the FR and MM records storage 216 and associates the FRs with the MMs. The FRs 228 and MMs 230 are then provided to the CMC 114 (FIG. 1) for further consideration, processing, and/or technician action.

Figure 3:
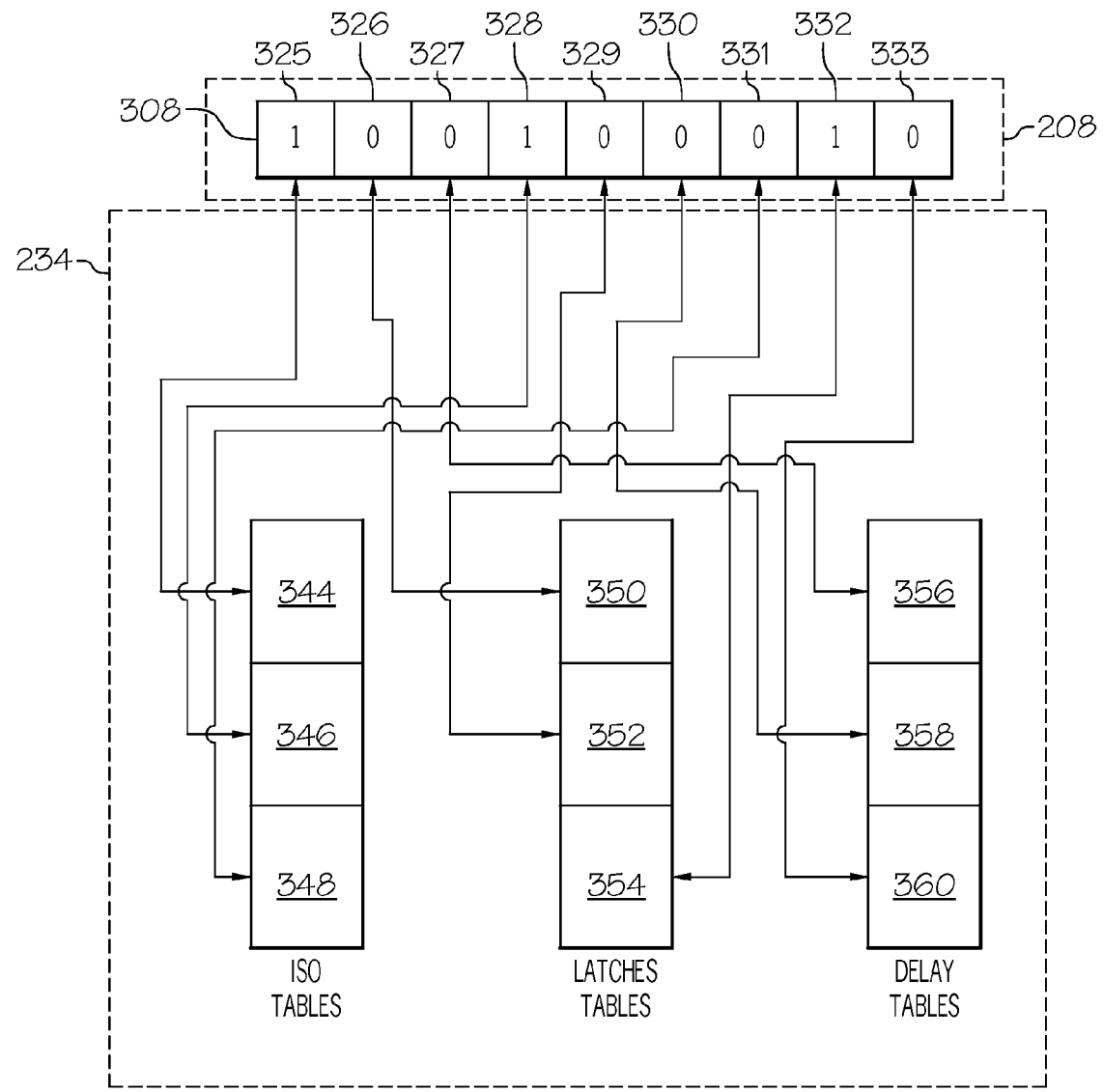
FIG. 3 is a more detailed block diagram of the fault processing module of FIG. 2.

FIG. 3 is a more detailed block diagram of a portion of the FPM 110, and particularly shows a portion of the execution sequence queue 208 and the LDI database 234. The LDI database 234 stores isolation tables 344, 346, 348 that each correspond to specific logic operations related to isolation logic, as well as latches tables 350, 352, 354 and delay tables 356, 358, 360 that represent the latches and delays in the isolation logic, respectively. Although latches and delay tables 350, 352, 354, 356, 358, 360 are illustrated, in alternate embodiments the logic associated with these tables can be incorporated into the isolation tables 344, 346, 348 and the separate latches and delay tables 350, 352, 354, 356, 358, 360 can be omitted. Moreover, although three isolation tables 344, 346, 348, three latches table 350, 352, 354, and three delay tables 356, 358, 360 are illustrated, it can be appreciated that many more isolation, latches, and delay tables can be provided.

The execution sequence 368 stored in the execution sequence queue 208 discussed briefly above is illustrated in more detail in FIG. 3. The execution sequence 368 is an ordered list indicating the isolation tables 344, 346, 348, the latches tables 350, 352, 354 and the delay tables 356, 358, 360 that should be executed in a given cycle based on the incoming monitor trips and the previous execution cycles.

The execution sequence 368 comprises a plurality of execution entities 325-333, each of which corresponds to one of the isolation tables 344, 346, 348, the latches tables 350, 352, 354 or the delay tables 356, 358, 360. For example, the execution entity 325 is associated with the isolation table 344; the execution entity 326 is associated with the latches table 350; the execution entity 327 is associated with the delay table 356; the execution entity 328 is associated with the isolation table 346; and so on.

The execution entities 325-333 are marked with one of two predetermined states to indicate whether the corresponding isolation tables 344, 346, 348, the latches tables 350, 352, 354 or the delay tables 356, 358, 360 should be executed. In this exemplary embodiment, the states are represented by a 1 and a 0. A 1 in the execution entities 325-333 indicates that the corresponding isolation tables 344, 346, 348, latches tables 350, 352, 354 or delay tables 356, 358, 360 should be executed. Conversely, a 0 in the execution entities 325-333 indicates that the corresponding isolation tables 344, 346, 348, latches tables 350, 352, 354 or delay tables 356, 358, 360 do not need to be executed. As such, in the illustrated embodiment, the 1 in the execution entity 325, the execution entity 328, and the execution entity 332 respectively indicates that the isolation table 344, the isolation table 346, and the latches table 354 should be executed in this execution cycle. Although the illustrated embodiment includes two possible predetermined states, it should be appreciated that additional states can be provided.

As discussed above, the execution sequence processor 206 (FIG. 2) processes each of the execution entities 325-333 in the execution sequence 368 stored in the execution sequence queue 208 to determine whether the execution entities 325-333 is a 1 or a 0, and thus, whether the associated isolation tables 344, 346, 348, latches tables 350, 352, 354 or delay tables 356, 358, 360 should be executed. If an execution entity 325, 328, 331 associated with an isolation table 344, 346, 348 indicates that the isolation table 344, 346, 348 is to be executed, the isolation table processor 214 (FIG. 2) processes the necessary isolation table 344, 346, 348 using the inputs from the variables table 204. If an execution entity 326, 329, 332 associated with a latches table 350, 352, 354 indicates that the latches table 350, 352, 354 is to be executed, the latches processor 212 (FIG. 2) processes the necessary latches table 350, 352, 354. Similarly, if an execution entity 327, 330, 333 associated with a delay table 356, 358, 360 indicates that the delay table 356, 358, 360 is to be executed, the time delay processor 210 (FIG. 2) processes the necessary delay table 356, 358, 360.

Generally, a particular execution entity 310-323 is designated to be executed (i.e., marked with a 1) in one of two ways: an incoming monitor trip to the variables table 204 is associated with a particular isolation table 344, 346, 348, latches table 350, 352, 354 or delay table 356, 358, 360; and/or the execution of an isolation table 344, 346, 348, latches table 350, 352, 354 or delay table 356, 358, 360 triggers the execution of another isolation table 344, 346, 348, latches table 350, 352, 354 or delay table 356, 358, 360. For an example of the latter type, some outputs from one isolation table 344, 346, 348 may be used as inputs for another isolation table 344, 346, 348. As such, the execution of the one isolation table 344, 346, 348 may necessitate the execution of another isolation table 344, 346, 348, either in the present cycle or the next cycle. Similarly, the execution of latches tables 350, 352, 354 or delay tables 356, 358, 360 may require execution of another isolation table 344, 346, 348, latches table 350, 352, 354 or delay table 356, 358, 360 in the present cycle or the next cycle. The information about the relationships between isolation tables 344, 346, 348, latches tables 350, 352, 354, and delay tables 356, 358, 360 resulting in triggers are maintained by the variables table 204. Triggers are discussed in further detail below in the discussion and the processing of an alternate execution sequence 300 of FIGS. 4-7.

Figure 4:
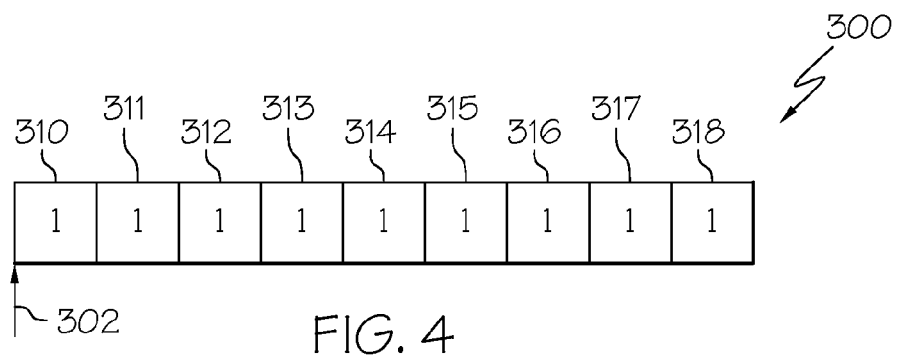
FIG. 4 is an exemplary execution sequence for use in the fault processing module of FIG. 2 during a first processing cycle.

FIGS. 4-7 illustrate the alternate execution sequence 300 having execution entities 310-318 in various scenarios. The exemplary execution sequence 300 shown in FIG. 4 is an initial execution sequence during a first execution cycle. As discussed above, the DCITM 112 (FIG. 1) only provides monitor trips that have changed since the previous processing cycle. In this case, since this is an initial processing cycle, there is no "previous" processing cycle, and all of the monitor trips are provided to the variables table 204 (FIG. 2). As noted above, when a monitor trip is received by the variables table 204, all of the associated isolation tables are marked for execution in the execution sequence by the execution sequence processor 206 (FIG. 2) by designating the execution entities 310-318 as a 1. As such, in this case, since all of the monitor trips are provided, all of the execution entities 310-318 are marked with a 1.

The execution sequence processor 206 (FIG. 2) processes each of the execution entities 310-318 in order. Arrow 302 indicates the processing position in the execution sequence processor 206 (FIG. 2) in the execution sequence 300. In FIG. 4, the execution sequence processor 206 (FIG. 2) is beginning to process the execution sequence 300 at the first execution entity 310.

Figure 5:
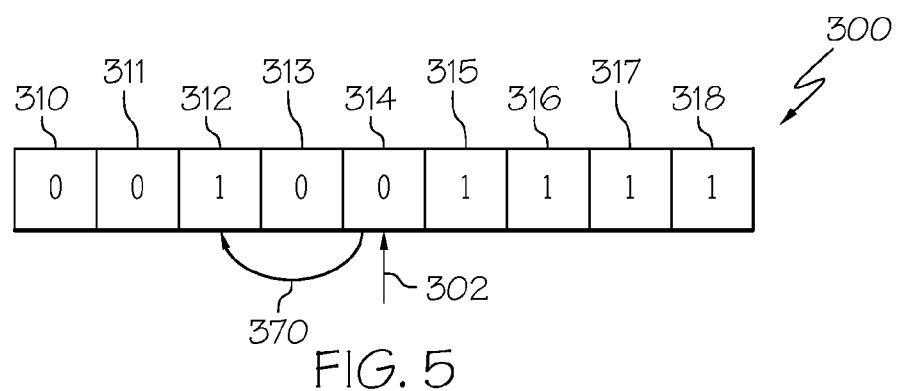
FIG. 5 is the exemplary execution sequence of FIG. 4 during the first processing cycle.

FIG. 5 illustrates the execution sequence 300 during the same processing cycle of FIG. 5 as the execution entities 310-318 are being processed. As indicated by the arrow 302, the execution sequence processor 206 (FIG. 2) has processed and marked for execution the first five execution entities 310-314 in the execution sequence. As the execution sequence processor 206 (FIG. 2) processes an execution entity (e.g., 310, 311, 313, 314), the execution sequence processor 206 (FIG. 2) changes the execution entity (e.g., 310, 311, 313, 314) of the execution sequence 300 from a 1 to a 0 to indicate that the associated isolation table, latches table or delay table has been executed.

In FIG. 5, the execution sequence processor 206 (FIG. 2) has processed the first, second, fourth, and fifth execution entities 310, 311, 313, 314, and as a result, has changed the designation of these execution entities 310, 311, 313, 314 from a 1 to a 0. The execution sequence processor 206 has also processed the third execution entity 312, although FIG. 5 still illustrates the third execution entity 312 as a 1. This is because while processing the fifth execution entity 314, the fifth execution entity 314 indicated that the isolation table, latches table, or delay table associated with third execution entity 312 should be executed with the isolation table, latches table, or delay table associated with the fifth execution entity 314. In FIG. 5, this is illustrated as a trigger 370. As noted above, the trigger 370 from the fifth execution entity 314 can result from the execution of the isolation table, latches table, or delay table associated with the fifth execution entity 314. The triggers (e.g., 326) associated with the isolation execution entities (e.g., 310-323) are maintained and associated with the appropriate execution entities (e.g., 314) by the variables table 204 based on data received form the LDI database 234. The trigger 370 for the fifth execution entity 314 is merely an example. Any execution entity 310-323 can trigger any other execution entity 310-318, or no other execution entity 310-323.

Figure 6:
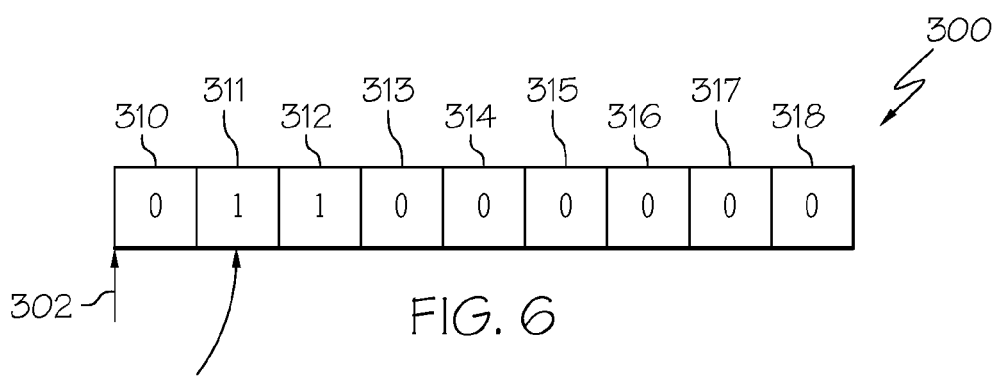
FIG. 6 is the exemplary execution sequence of FIG. 4 during a second processing cycle.

FIG. 6 illustrates the execution sequence 300 in the processing cycle immediately following the processing cycle illustrated in FIGS. 4 and 5. In this processing cycle, two execution entities 311, 312 are designated as a 1 and will result in the isolation tables associated with these execution entities 311, 312 to be executed. The third execution entity 312 is marked as a 1 after being triggered by the fifth execution entity 314 (see FIG. 5). The second execution entity 311 is marked with a 1 because the monitor trips associated with this execution entity 311 has changed value from the previous processing cycle.

Figure 7:
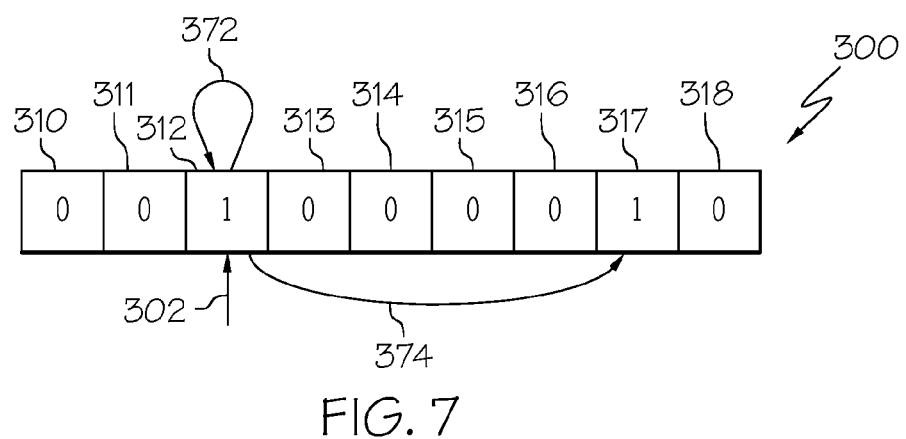
FIG. 7 is an exemplary execution sequence of FIG. 4 during the second processing cycle.

FIG. 7 illustrates the execution sequence 300 during the same processing cycle as FIG. 6. In FIG. 7, the processing position 302 of the execution sequence processor 206 is at the third execution entity 312 and has processed the second execution entity 311 and changed the state of the second execution entity 311 from a 1 to a 0. During the processing of the third execution entity 312, a trigger 372 triggers the execution of the third execution entity 312 and a trigger 374 triggers the execution of the eighth execution entity 317. The execution sequence processor 206 will process the third execution entity 312 during the following processing cycle and will process the eighth execution entity 317 during the current processing cycle.

Referring again to FIGS. 1, 2 and 3, the processing of the isolation tables 344, 346, 348, and the associated latches tables 350, 352, 354 and delay tables 356, 358, 360, results in the identification of faults that are provided to the FR and MM record storage database 216, and then to the CMC 214. Accordingly, exemplary embodiments provide a more efficient use of processing resources. Particularly, only the monitor trips that have changed are provided to the variables table 204 (FIG. 1). Moreover, the execution sequence queue 208 maintains a list associated with the necessary logic that must be executed during a given cycle or a subsequent cycle (FIG. 3). This results in a fault processing module that does not have to process data associated with every monitor trip and associated logic during each cycle. Although the FPM 110 and the AHM 102 are discussed herein, aspects of exemplary embodiments are equally applicable to other types fault detection and/or determination modules. Moreover, aspects of exemplary embodiment can be incorporated into any type of data processing units, such as for example, any type of cellular automata or other class of programs that use a collection of computing units that are interconnected where each unit uses the same software algorithm but is specialized by its internal variables and the values of its inputs. Alternate examples include neural networks, finite element models, classifier systems, and a wide range of control/simulation applications.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An aircraft system, comprising:
   an aircraft subsystem generating monitor trips related to the health of the aircraft subsystem; and
   an area health manager coupled to the aircraft subsystem, the area health manager comprising:
      a data receiver for receiving the monitor trips from the aircraft subsystem;
      a fault detector for processing inputs based on the monitor trips to identify faults, the fault detector configured to store logic operations; and
      an execution sequence queue coupled to the fault detector for storing a plurality of execution entities, each of the plurality of execution entities being associated with a specific logic operation in the fault detector that is executed when the associated execution entity is in a first predetermined state based at least in part on the monitor trips.

2. The aircraft system of claim 1, wherein at least one of the logic operations includes an isolation table.

3. The aircraft system of claim 2, wherein the logic operations include a latches table and a delay table.

4. The aircraft system of claim 3, further comprising an isolation table processor coupled to the execution sequence queue for executing the respective isolation table when the associated execution entity is in the first predetermined state, a latches table processor coupled to the execution sequence queue for executing the respective latches table when the associated execution entity is in the first predetermined state, and a delay table processor coupled to the execution sequence queue for executing the respective delay table when the associated execution entity is in the first predetermined state.

5. The aircraft system of claim 1, further comprising a variables table coupled to the fault detector for providing the inputs to the specific logic operations,
   the data receiver including a ping pong buffer that determines monitor trips that have changed relative to an immediately preceding cycle, the data receiver providing only the changed monitor trips to the variables table.

6. The aircraft system of claim 5, wherein the variables tables associates the changed monitor trips with the specific logic operations.

7. The aircraft system of claim 6, wherein the changed monitor trips result in the execution entities associated with the specific logic operations being in the first predetermined state.

8. The aircraft system of claim 1, further comprising an execution sequence processor coupled to the execution sequence queue for evaluating the predetermined state of each of the plurality of execution entities of the execution sequence.

9. The aircraft system of claim 8, wherein the execution sequence processor, after evaluating one of the execution entities, changes the one execution entity to a second state.

10. The aircraft system of claim 8, wherein the evaluation by the execution sequence processor of a first execution entity triggers the execution sequence processor to change a second execution entity from a second state to the first state.

11. The aircraft system of claim 1, further comprising a central maintenance computer coupled to the area health manager, the specific logic operations producing fault reports provided to the central maintenance computer.

12. The aircraft system of claim 1, wherein the fault detector and the execution sequence queue form a fault processing module.

13. The aircraft system of claim 1, wherein the data receiver is a data collection and initiated test module.

14. An area health manager, the area health manager comprising:
   a data receiver for receiving monitor trips from an aircraft subsystem;
   a fault detector for processing inputs based on the monitor trips to identify faults, the fault detector configured to store logic operations; and
   an execution sequence queue coupled to the fault detector for storing a plurality of execution entities, each of the plurality of execution entities being associated with a specific logic operation in the fault detector that is executed when the associated execution entity is in a first predetermined state based at least in part on the monitor trips.

15. The area health manager of claim 14, wherein at least one of the logic operations includes an isolation table.

16. The area health manager of claim 15, wherein the logic operations include a latches table and a delay table.

17. The area health manager of claim 16, further comprising an isolation table processor coupled to the execution sequence queue for executing the respective isolation table when the associated execution entity is in the first predetermined state, a latches table processor coupled to the execution sequence queue for executing the respective latches table when the associated execution entity is in the first predetermined state, and a delay table processor coupled to the execution sequence queue for executing the respective delay table when the associated execution entity is in the first predetermined state.

18. The area health manager of claim 14, further comprising a variables table coupled to the fault detector for providing the inputs to the specific logic operations,
   the data receiver including a ping pong buffer that determines monitor trips that have changed relative to an immediately preceding cycle, the data receiver providing only the changed monitor trips to the variables table.

19. The area health manager of claim 18, wherein the variables tables associates the changed monitor trips with the specific logic operations.

20. A data processing unit, comprising:
- a data receiver configured to receive monitor trips from an aircraft subsystem;
- a data processing module coupled to the data receiver and configured to process inputs based on the monitor trips and to store logic operations; and
- an execution sequence queue coupled to the data processing module for storing a plurality of execution entities, each of the plurality of execution entities being associated with a specific logic operation in the data processing module that is executed when the associated execution entity is in a first predetermined state based at least in part on the monitor trips.

* * * * *